United States Patent
Schäfer et al.

(10) Patent No.: US 8,603,655 B2
(45) Date of Patent: Dec. 10, 2013

(54) ACCUMULATOR COMPRISING A PLURALITY OF GALVANIC CELLS

(75) Inventors: Tim Schäfer, Niedersachswerfen (DE); Andreas Gutsch, Lüdinghausen (DE)

(73) Assignee: Li-Tec Battery GmbH, Kamenz (DE)

( * ) Notice: Subject to any disclaimer, the term of this patent is extended or adjusted under 35 U.S.C. 154(b) by 770 days.

(21) Appl. No.: 12/604,542

(22) Filed: Oct. 23, 2009

(65) Prior Publication Data

US 2010/0112417 A1  May 6, 2010

(30) Foreign Application Priority Data

Oct. 24, 2008 (DE) .................. 10 2008 053 089

(51) Int. Cl.
*H01M 10/48* (2006.01)
*H01M 10/50* (2006.01)

(52) U.S. Cl.
USPC ............... 429/61; 429/62; 320/125; 320/155

(58) Field of Classification Search
USPC ................... 429/50, 61, 62; 320/125, 155
See application file for complete search history.

(56) References Cited

U.S. PATENT DOCUMENTS

| | | | |
|---|---|---|---|
| 4,241,829 A | 12/1980 | Hardy | |
| 4,253,892 A | 3/1981 | D'Angelo et al. | |
| 4,664,994 A | 5/1987 | Koike et al. | |
| 5,644,212 A | 7/1997 | Takahashi | |
| 5,739,671 A | 4/1998 | Hamada | |
| 5,871,861 A | 2/1999 | Hirokou et al. | |
| 6,278,257 B1 * | 8/2001 | Takada et al. | 320/116 |
| 6,391,491 B1 | 5/2002 | Kim | |
| 2003/0215702 A1 | 11/2003 | Tanjou et al. | |
| 2003/0224246 A1 | 12/2003 | Watanabe et al. | |

(Continued)

FOREIGN PATENT DOCUMENTS

| AU | B1723383 A | 2/1984 |
|---|---|---|
| AU | 556049 B2 | 10/1986 |

(Continued)

OTHER PUBLICATIONS

European Search Report EP09012720 published Apr. 19, 2010.

(Continued)

*Primary Examiner* — Stephen J. Kalafut
(74) *Attorney, Agent, or Firm* — Choate, Hall & Stewart LLP; Andrea L. C. Robidoux; Daniel S. Matthews

(57) ABSTRACT

In accordance with the invention, an accumulator comprises at least two galvanic cells that are electrically connected. The accumulator furthermore comprises a control device and at least one measuring device. The measuring device is suitable to determine at least one reading for at least one first functional parameter of a galvanic cell. The accumulator comprises a memory device which is assigned to the control device. The memory device is suitable for storing at least one target value of a first functional parameter. The accumulator furthermore comprises a computing unit. The computing unit is suitable for assigning at least two measured values and one pertinent target value to a first computed result. The measured values are the measured first functional parameters, respectively of at least two galvanic cells of the accumulator. The target value is a predetermined value in respect to the first functional parameter. The control device is suitable for initiating a predetermined action as a function of the first computed result.

12 Claims, 2 Drawing Sheets

(56) References Cited

U.S. PATENT DOCUMENTS

Figure 1:
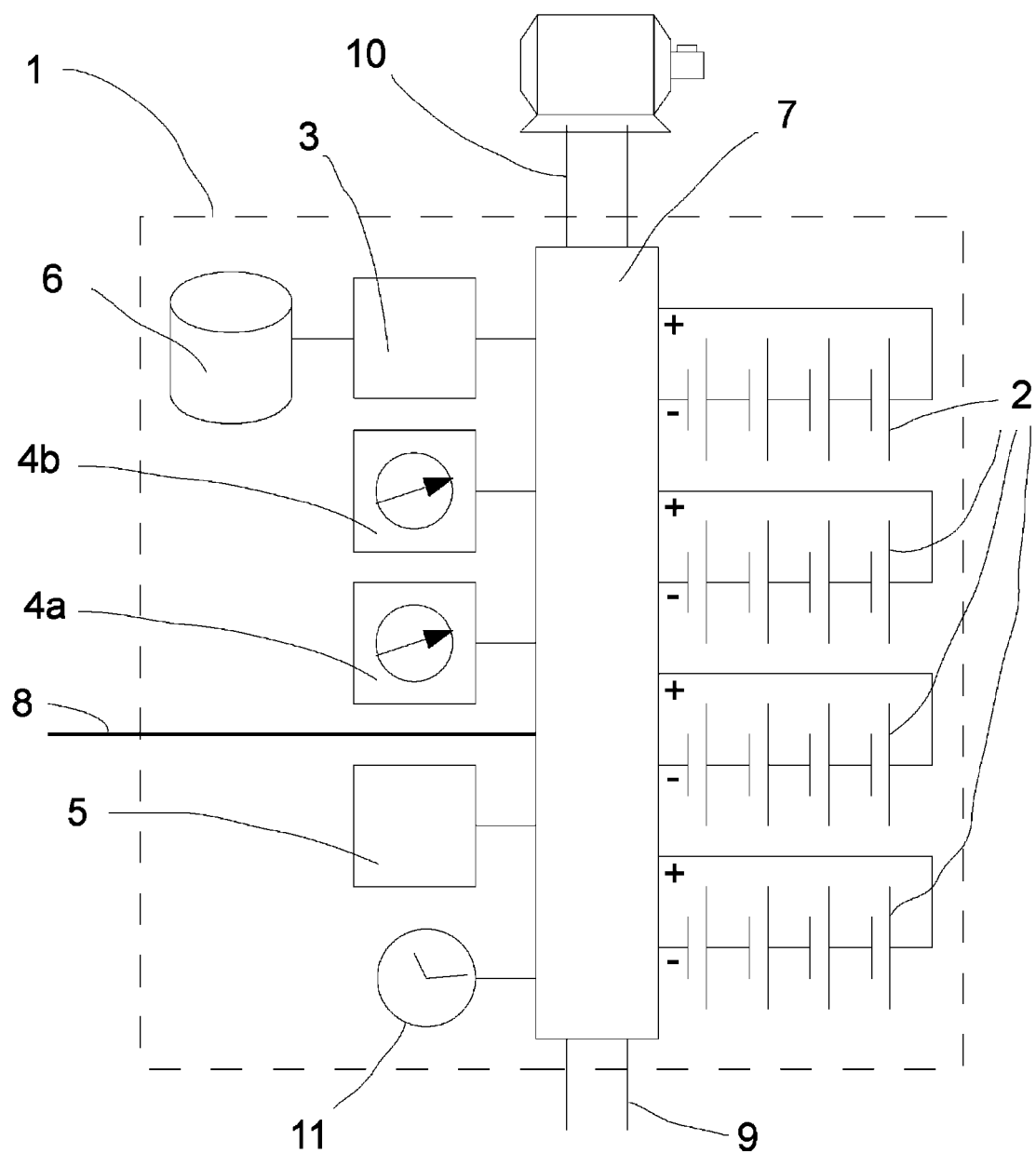

| | | |
|---|---|---|
| 2004/0257042 A1 | 12/2004 | Liu et al. |
| 2006/0073383 A1 | 4/2006 | Han et al. |
| 2006/0134515 A1 | 6/2006 | Kumashiro et al. |
| 2006/0137175 A1 | 6/2006 | Hayashi et al. |
| 2007/0055951 A1 | 3/2007 | Hayashi et al. |
| 2007/0095711 A1 | 5/2007 | Thompson et al. |
| 2008/0274394 A1 | 11/2008 | Schormann et al. |
| 2010/0159306 A1 | 6/2010 | Leuthner |

FOREIGN PATENT DOCUMENTS

| | | |
|---|---|---|
| DE | 4420249 A1 | 12/1995 |
| DE | 10202807 A1 | 8/2003 |
| EP | 0570590 A1 | 11/1993 |
| EP | 586232 A2 | 3/1994 |
| EP | 0862230 A2 | 9/1998 |
| EP | 0949699 A2 | 10/1999 |
| EP | 1020943 A1 | 7/2000 |
| EP | 1079450 A1 | 2/2001 |
| EP | 1085592 A2 | 3/2001 |
| EP | 1146579 A2 | 10/2001 |
| EP | 1976043 A1 | 10/2008 |
| EP | 1981100 A1 | 10/2008 |
| EP | 2251219 A2 | 11/2010 |
| EP | 2254219 A1 | 11/2010 |
| JP | 59146166 | 8/1984 |
| JP | 2000328159 A | 11/2000 |
| JP | 2002266041 A | 9/2002 |
| JP | 2003257418 A | 9/2003 |
| JP | 2005071784 A | 3/2005 |
| JP | 2006066083 A | 3/2006 |
| WO | WO-03015192 A2 | 2/2003 |
| WO | WO2004/049540 | 6/2004 |
| WO | WO-2005042374 A1 | 5/2005 |
| WO | WO-2005122294 A1 | 12/2005 |
| WO | WO-2008004161 A2 | 1/2008 |

OTHER PUBLICATIONS

European Search Report EP09013438 published Jul. 1, 2010.
European Search Report for EP 09008936 published Oct. 14, 2009.
European Search Report for EP09012719 published Mar. 5, 2010.
European Search Report for EP09012719 published May 19, 2010.
European Search Report for EP09013438 published Feb. 16, 2010.
European Search Report for EP09013439 published Dec. 12, 2009.
European Search Report for EP09013439 published Feb. 16, 2010.
European Search Report for EP09014759 published Jan. 25, 2010.
International Search Report for PCT/EP2008/010035 published Mar. 11, 2009.
Technical data sheet: PE Polyethylene, Jan. 7, 2010, Merk & Partner GMBH, XP002562200.
Technical data sheet: PET Polyethylenterephtalate, Jan. 7, 2010, Merk & Partner GMBH, XP002562120.
Technical data sheet: PP Polpropylene, Jan. 7, 2010, Merk & Partner GMBH, XP002562121.
European Search Report dated Feb. 11, 2010 for application No. EP 09 012 720.0.
Partial Search Report for EP13000639, dated Mar. 1, 2013 (12 pages).

* cited by examiner

ACCUMULATOR COMPRISING A PLURALITY OF GALVANIC CELLS

The present invention relates to a galvanic cell for an accumulator. The invention is described in the context of lithium-ion accumulators for powering electrical drives, in particular electric vehicles. It is noted that the invention may also be used independent of the type of accumulator or independent of the type of the powered drive.

Accumulators comprising a plurality of galvanic cells are known from the prior art, also for powering a drive of electrical vehicles. Some embodiments comprise a plurality of cells that are electrically interconnected. In some embodiments, it may occur that not all cells are completely charged after a charging cycle. Thereby, only a fraction of the available loading capacity can be used.

Therefore, one object of the present invention is to improve the utilization of the available load capacity of an accumulator. The object is solved by means of the and the process for the operation thereof according to examples described herein. Preferred embodiments of the invention are described herein.

According to the invention an accumulator comprises at least two galvanic cells, which are electrically interconnected. Furthermore, an accumulator comprises at least one control device and at least one measuring device. The measuring device is provided in order to determine at least one reading assigned to a first functional parameter of a galvanic cell. The accumulator comprises a memory device, which is assigned to the control device. The memory device is provided for storing at least one target value of a first functional parameter. The accumulator furthermore comprises a computing unit. The computing unit is provided for associating at least two readings and one target value with one first computed result. The readings are the measured first functional parameters of at least two galvanic cells of the accumulator. The first target value is a predetermined value assigned to the first functional parameter. The control device is provided to initiate a predetermined action, depending on the first computed result.

In accordance with the present invention, an accumulator is to be understood to be a device that serves the purpose of storing and delivering electrical energy. During its utilization, the accumulator is repeatedly loaded and subsequently discharged in order to supply an electrical load. In order to store electrical energy, accumulator comprises at least two galvanic cells and some additional devices, which allow for the proper operation of the accumulator. It is customary that an accumulator, for example one for supplying a drive of a vehicle, is equipped with a plurality of galvanic cells.

In accordance with the present invention, a galvanic cell is to be understood to be a device which converts electrical energy as supplied into chemical energy and stores the same as such. Upon discharge, the chemical energy as stored is at first re-converted into electrical energy. The galvanic cell comprises at least two leads, which are characterized in that they have opposite polarity. The available load capacity of a galvanic cell diminishes with increasing age or increasing loading/discharging cycles, based on irreversible chemical reactions. In order to maintain load capacity or in order to lengthen the usage, respectively, overcharging of a galvanic cell, as well as the deep discharge of the same are to be avoided. In particular in combination with further galvanic cells, a galvanic cell is exposed to an increased danger of overcharge or deep discharge.

The at least two galvanic cells are interconnected with each other. Typically, however, an accumulator comprises a larger number of galvanic cells. In some instances, these are connected in series to achieve a targeted open circuit voltage of the accumulator and/or in parallel in order to achieve an enhanced load capacity. It is also possible to connect a plurality of groups of galvanic cells in parallel. Therein, the galvanic cells of a group are connected in series.

In accordance with the present invention, a control device is to be understood to be a device that also controls and monitors the interaction of the different devices of the accumulator in the various operational states thereof. Preferably, the control device is realized as an electronic module. If needed, the control device of the accumulator may be changed. According to a particularly preferred embodiment, the code for operating the control device may be overwritten, for example in the context of maintenance operations.

In accordance with the present invention, a measuring device is to be understood to be a device which measures a physical parameter or a functional parameter of a galvanic cell with at least one suitable sensor. Preferably, the measuring device provides the reading of the physical parameter as an electronic signal. In case the sensor does not provide a signal that can be electronically processed, for example by means of a proportional voltage, the measuring device converts the signal, in a first step, into a proportional voltage. Preferably, the measuring device can be used to determine a physical parameter of a plurality of galvanic cells, particularly preferred within a time interval of fractions of a second. Preferably, a physical parameter of a galvanic cell is determined within several subsequent intervals and a filtering of the signal is already provided in the measuring device. Dependent on the type of accumulator, it is reasonable that the same is equipped with a plurality of measuring devices. For example, a group of galvanic cells may be equipped with its own measuring device. Therein, the measuring device comprises the sensors that are necessary for recording the operational status and/or the properties of the galvanic cell. These sensors are, for example, temperature sensors, current sensors, voltage sensors. A measuring device may, however, also be alternately connected with individual cells or groups of cells, in the measuring mode, upon demand.

In accordance with the present invention, a memory device is to be understood to be a device, which also stores data and information obtained during the operation of the accumulator. The stored data information may also be read. Preferably, it is an electronic memory module comprising data, computing rules and/or rules for the operation of the control device in different areas thereof. It is particularly preferred that the memory device also maintains stored content without power supply. Storage of data, computing rules and/or rules for the operation of the control device may also occur on several separate memory devices.

In accordance with the present invention, the term functional parameter is to be understood to relate to physical entities that are suitable for describing the properties and the operational state of a galvanic cell. These are, for example, loading capacity of a cell, the actual degree of charging, i.e. partial charging of the cell, the electrical open circuit voltage of the same or the terminal voltage that is load dependent, the amperage of the electric current for loading or discharging, the impedance of the galvanic cell, the electrical charge as charged or as available in the galvanic cell, a potential electrical leak current inside the cell, the temperature thereof. Depending on the requirements for the operation of said accumulator, other physical parameters of the galvanic cell may also be of interest. Other functional parameters are, for example, the number of charge cycles, the age of the cell, the degree of discharge since the last charging event, as well as similar information.

In accordance with the present invention, a target value of a functional parameter is to be understood to be a desired and/or targeted value that is assigned to said functional parameter. Furthermore, a target value is also to be understood to be a desired and/or planned progress over time of a functional parameter of a galvanic cell. The target value is also to be understood to be the set point in accordance with the meaning of said expression for the area of control technology. A stored target value may be overwritten, if needed, for example in case a computed result or the performance of a galvanic cell or an accumulator, respectively, triggers the same.

In accordance with the present invention, a computing device is to be understood to be a device that is suited to connect recorded readings and target values with each other in an algorithm. For example, the deviation is computed as a difference between reading and target value. For example, the deviation is computed as a ratio of reading and target value:

$$A = \frac{M - Z}{Z}$$

wherein A is the deviation, M the reading of a functional parameter and Z the target value. Furthermore, the computing device provides the result of the association as the computed result. Therein, the computing unit may also process two separate associations of one reading, respectively, with a target value, in regard to two different galvanic cells. Therein, the computing device determines the deviation of the operational status of at least two galvanic cells in respect to a desired or targeted status of operation.

In accordance with the present invention, the first computed result is to be understood to be the deviation of a reading of a functional parameter from the respective target value. Therein, the first computed results may comprise several individual results that relate to individual galvanic cells, for example as many individual results as there are galvanic cells measured. Based on a computed result comprising several individual results, it may be determined that one galvanic cell has a significantly different status of charging than the rest, compared to all cells subjected to this comparison.

Upon charging or discharging, respectively, of cells that are interconnected with each other and have a different status of charging, respectively, individual cells may be overcharged or deeply discharged. Both is damaging. If, however, on the other hand the charging or discharging process is aborted prematurely, part of the load capacity of the accumulator goes unused. Depending on the first computed result, the control device is provided to initiate a correction in case of an unwanted deviation between a reading and a respective target value of a galvanic cell. Such a correction measure may be to provide the computing unit with a new target value. Furthermore, further devices of the accumulator may be shut down or may be added. The time period between two readings of a functional parameter of a galvanic cell may be altered. Preferably, the charging or discharging current, respectively, of a galvanic cell is limited or increased in case of a deviation regarding the status of charging. A charging or discharging process of a galvanic cell may be initiated or aborted early. A cooling or a heating device may be switched on. Object of the measure is to equalize or to adjust different states of charging of a plurality of cells.

Thereby, the available load capacity of an accumulator is more efficiently used and the object according to the present invention is solved. In the following, preferred embodiments of the invention are described.

Preferably, a memory device of the accumulator is provided in order to store readings for functional parameters of a galvanic cell together with other values, which allow for an assignment in regard to time and/or an assignment in regard to a specific galvanic cell. Also, values derived from readings can be stored, together with the respective values for the reading. Based on these data, a protocol of the operating process of the different galvanic cells of the accumulator according to the invention is established. The process protocol allows, for example, to record the progress of aging of individual galvanic cells or to obtain information about the usage of the drive as supplied, which potentially deviates from the planned usage.

Preferably, the control device is provided to report to the computing unit about a target value or the progress of a target value in regard to a functional parameter. This is implemented also by taking into account the progressing aging of a galvanic cell. Also, by means of this process, a particular load of the accumulator can be taken into account, for example if a particularly high current is withdrawn from the accumulator for a certain period of time. An altered target value, for example in regard to the strength of the charging or discharging current, may also be communicated when the temperature of the galvanic cell is higher than desired for other reasons.

Preferably, the purpose of the control device is to control and to monitor the charging and the discharging of a galvanic cell. Preferably, the charging and the discharging, respectively, of a galvanic cell are performed in accordance with predetermined instructions in regard to charging. The term "instruction in regard to charging" presently encompasses instructions for charging of a galvanic cell as well as for the discharging of the same. For example, an instruction in regard to charging comprises a predetermined progress for current vs. time for the charging and/or discharging process of a galvanic cell. In accordance with the present invention, the term "state of charge" is to be understood to comprise such information that is suitable for describing the state of a galvanic cell. The term is therefore to be understood to be broader than the previously used term "functional parameter" and comprises the same. The term "state of charge" also comprises information regarding the charging and the discharging process of a galvanic cell in the more recent past. For the state of charge of a galvanic cell, also the progress over time of the charging or discharging, respectively, of the more recent past, which have led to the energy storage status, are of importance. In particular, high discharging currents based on acceleration processes of vehicles, deep discharge or overcharging are particularly demanding on a galvanic cell. Preferably, in order to determine the state of charge, the first computed result is also used. Therein, an instruction in regard to charging is also adapted to particular demands, in particular temperature of the galvanic cell and/or any partial charging thereof. Based on the occurrence of a certain state of charge, the control device controls the charging or the discharging, respectively, of a galvanic cell in accordance with an instruction in regard to charging corresponding to said state of charging. Preferably, the predetermined instructions in regard to charging are stored on the memory device. Preferably, the control device controls the process of charging by means of an independent charging device, by means of the control unit transmitting the instruction in regard to charging as used to the independent charging device.

Preferably, the control device is provided in order to charge or discharge, respectively, two galvanic cells in accordance with different predetermined instructions in regard to charging, in case different states of charging prevail. During the operation of an accumulator, it may occur that two galvanic cells have a different state of charge or that different values are measured for the same functional parameter, respectively. A different progress of current vs. time, different temperatures and a different degree of charging of a galvanic cell, i.e. partial charging in this context, are of particular relevance. This information also allows conclusions about the different demands on the respective galvanic cell in the more recent past. In case galvanic cells having a different state of charging are nevertheless treated according to the same instruction in regard to charging, it may occur that, at the conclusion of a charging process, one of the cells is overcharged and has heated up, while another galvanic cell is not completely charged. In order to most comprehensively equilibrate different states of charge, the charging or the discharging of galvanic cells of the accumulator, respectively, suitably occurs in accordance with different predetermined instructions in regard to charging. Therein, two otherwise identical instructions in regard to charging may be characterized in that they only differ in regard to the time interval or the amperage.

Preferably at least one predetermined instruction in regard to charging comprises at least one loading pulse. A loading pulse is a progress of amperage as a function of time within a limited time interval and/or the respective progress of voltage. An instruction in regard to charging may also comprise a sequence of individual loading pulses. In the present case, a loading pulse is to be understood to be a supply or withdrawal of an amount of energy within a limited time period. Therein, the electrical energy as supplied or as withdrawn may change over time.

Preferably, the control device is suited to adapt an instruction in regard to charging based on first computed results, and to overwrite the same. Therein, it is possible, for example, that an instruction in regard to charging for a partially damaged galvanic cell is adapted or an instruction in regard to charging in its own right is implemented. This may be necessary in case a galvanic cell gets unexpectedly hot if treated according to a suitable instruction in regard to charging, or in case the behavior allows for conclusions in regard to an unplanned diminishing of the available load capacity.

Preferably, the control device is suited for exchanging signals with an independent control. At least from time to time, the control device exchanges predetermined status reports with the independent control. The exchange of status information may also comprise a confirming signal by the respectively other control. Therein, in particular such status information is exchanged that allows conclusions about unexpected or erroneous behavior of an accumulator or of one of its units.

Preferably, an accumulator in accordance with the present invention is operated in a manner so that a number of process steps is executed in a planned sequence in regard to time or, if necessary, also during the charging or discharging process, respectively, of a galvanic cell. These steps are implemented in a comparatively narrow time sequence and allow for the control device to receive information about the functional parameters and also the state of charge of a galvanic cell within a short period of time.

Preferably, an accumulator according to the invention is operated in a manner so that the control device initiates an action for correcting the state of charge once a certain first computed result and the corresponding state of charge is available. These actions are predetermined and concern further units of the accumulator, instructions in regard to charging that are to be used or trigger the sending of a report to a control in a higher hierarchy.

Preferably, an accumulator according to the invention is operated so that events from the operation of the accumulator are stored in the memory device. Other than actions taken, these events may also relate to concluded actions of the control device. In particular, such actions or events are to be stored, which allow conclusions about an improper modus of operation of the accumulator.

Preferably, an accumulator according to the invention is operated in a manner that the control device considers different stages of charge for individual galvanic cells, respectively, depending on the first computed results. The control device initiates different instructions in regard to charging for galvanic cells having a different status of charge in order to preserve galvanic cells or to use the loading capacity to the greatest extent.

Figure 2:
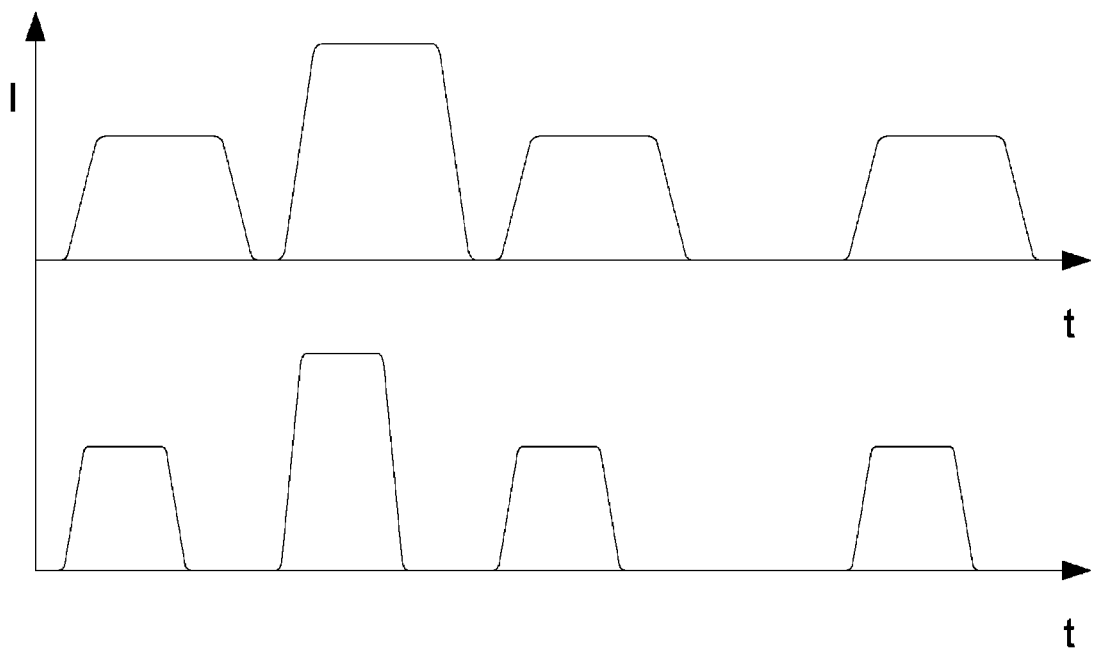

Further advantages, features and uses of the present invention follow from the following description in the context of the Figures. These show:

FIG. 1 a schematic set-up of an exemplary embodiment of an accumulator in accordance with the present invention FIG. 2 two examples of loading pulses based on two instructions in regard to charging for charging a galvanic cell FIG. 1 shows a schematic depiction of an accumulator 1 according to the invention which supplies the drive of a vehicle. The accumulator comprises four groups of galvanic cells, the input leads of which are shown in a simplified manner. Each of these groups comprises four galvanic cells 2, respectively, which are connected in series. Furthermore, accumulator 1 comprises a control device 3, two measuring devices 4a and 4b, one computing unit 5, a memory device 6 and a control line leading to an independent control 8. Further, the accumulator comprises a communication-bus 7 and wires for charging and discharging currents, respectively. The latter are only partially shown. Furthermore, connections 9 to an external loading device and leads 10 for connection with the vehicle drive are shown. Furthermore, a clock 11 is provided.

Despite the fact that a group of galvanic cells is shown as four cells that are connected in series, galvanic cells 2, respectively, can be individually charged and discharged. For reasons of clarity, the present depiction is simplified.

Measuring device 4a is a sensor for recording the temperature of the individual galvanic cells 2. One thermocouple as assigned to one cell 2, respectively, is connected with said thermosensor by means of communications-bus 7. Measuring device 4b is a measuring device for current. This measuring device for current 4b also is connected with different current sensors of the individual cells 2 or with the supply line 10 via communications-bus 7. After a measuring process, measuring device 4a or 4b provides the reading for further processing to the computing unit 5. Within a very short time interval, a functional parameter of several galvanic cells 2 is measured. Computing unit 5 obtains the readings together with a time signal and a further signal that allows the assignment of the reading to a galvanic cell 2. Furthermore, computing unit 5 obtains target values from the control device 3. Under normal operating conditions, computing unit 5 associates the readings in respect to a first functional parameter pertaining to individual galvanic cells 2 of one group with the target value leading to a first computed result. Said first computed result comprises four individual deviations, respectively, between a reading pertaining to a first functional parameter and the respective target value. Computing unit 5 provides this first computed results for further processing. Control device 3 transmits readings pertaining to functional parameters, the respective assignment to the respective galvanic cells 2, the specific point in time of the reading and the deviation from the target value to the memory device 6 for storage.

In knowledge of the operational status and using a first computed result, control device 3 initiates the charging or discharging of galvanic cells 2 in accordance with predetermined instructions in regard to charging. In case the charging conditions of galvanic cells 2 of a group varies significantly amongst each others, or in case the common charging condition of a group significantly deviates from the charging condition of another group, control device 3 initiates the charging or discharging of a group of galvanic cells or of individual galvanic cells 2 in accordance with different instructions in regard to charging. The object of optionally using different instructions in regard to charging is to equilibrate different charging conditions of individual charging cells 2, in case these differences are significant for diminishing the usable loading capacity of the accumulator or for the deep discharge or overcharging, respectively, of individual galvanic cells.

For example, control device 3 may provide, if needed, a particular monitoring of individual galvanic cells 2 by means of more frequent reading of functional parameters and comparison of the same with the target value.

In case the condition of individual galvanic cells 2 results in a significant diminishing of the available loading capacity of accumulator 1, control device 3 exchanges a predetermined message with a higher hierarchy control (not shown) via signal line 8. In case the temperature of individual galvanic cells 2 exceeds a target value, control device 3 diminishes the overall current that may be withdrawn in order to supply the vehicle drive and transmits a corresponding message to the higher hierarchy control.

As a further advantage, this effectively prevents overcharging or deep discharging of individual galvanic cells.

FIG. 2 exemplarily shows two pulse sequences according to different instructions in regard to charging. The upper pulse sequence is characterized in that it provides longer period pulses compared to the lower pulse sequence. Therein, the interval of the individual pulses is the same. The pulses respectively commence at the same moment in time. The upper pulse sequence is intended for a galvanic cell, which comprise a lower partial charge as the galvanic cell that is charged in accordance with the lower pulse sequence. It is not shown that the loading is terminated at an earlier point in time for the cell having the higher partial charge. Herein, the heating up of a galvanic cell during a charging process plays an important role. The heating-up may provide the occasion to strive for a complete equilibration of the different states of charge of two galvanic cells only after several charging cycles.

The invention claimed is:

1. An accumulator comprising:
at least two galvanic cells, wherein at least two galvanic cells are electrically interconnected,
a control device,
at least one measuring device, which is provided for determining a reading assigned to at least one first functional parameter of a galvanic cell,
a memory device, which is assigned to control device and is configured to store at least one target value of a first functional parameter, and
a computing unit, which is configured to associate at least one first reading of one first galvanic cell, a reading of a further galvanic cell and a target value leading to at least one first computed result,
wherein the control device is configured to (a) initiate a predetermined action as a function of the first computed result, (b) control the charging or the discharging, respectively, of a galvanic cell according to at least one predetermined instruction in regard to charging, and (c) switch on a cooling or heating device.

2. The accumulator according to claim 1, wherein the memory device is further configured to store a reading of a functional parameter and/or a quantity derived thereof, together with at least one first value that is representative for the point in time of the reading and/or together with at least one second value, which is representative for the galvanic cell pertaining to the reading.

3. The accumulator according to claim 1, wherein the control device is configured to, for at least parts of a time interval:
initiate the at least one measuring device,
initiate the computing unit,
and/or communicate a target value of a first functional parameter to the computing unit.

4. The accumulator according to claim 1, wherein the control device is further configured to control the charging or the discharging, respectively, of at least two galvanic cells in accordance with different predetermined instructions in regard to charging.

5. The accumulator according to claim 4, wherein the predetermined instruction in regard to charging comprises at least one loading pulse.

6. The accumulator according to claim 1, wherein the control unit is further configured to overwrite a predetermined instruction in regard to charging.

7. The accumulator according to claim 1, wherein the control device is configured to exchange a predetermined message with an independent control for at least parts of a time interval.

8. The accumulator according claim 1, wherein the heating or cooling device is adapted to equalize or to adjust different states of charging of a plurality of cells.

9. A process for operating an accumulator according to claim 1, wherein
the at least one measuring device measures a first functional parameter of at least two galvanic cells during at least parts of a time interval,
computing unit associates the readings of the first functional parameter for at least two galvanic cells with a target value of the first functional parameter leading to a first computed result,
computing unit transmits the first computed result to the control device,
the control device initiates a predetermined action while using a first computed result, and
the control device switches on a cooling or heating device.

10. The process according to claim 9, for operating an accumulator wherein at least one event relating to the charging and/or discharging processes of at least two galvanic cells is stored in memory device.

11. The process according claim 9 for operating an accumulator wherein the control device uses different instructions in regard to charging for each of the at least two galvanic cells while using a first computed result.

12. The process according to claim 9 for operating an accumulator, wherein the cooling or heating device equalizes or adjusts different states of charging of a plurality of cells.

* * * * *